US012596748B2

(12) United States Patent

Parnell et al.

(10) Patent No.: US 12,596,748 B2

(45) Date of Patent: Apr. 7, 2026

(54) GRAPH DATABASE STORAGE ENGINE

(71) Applicant: Neo4j Sweden AB, San Mateo, CA (US)

(72) Inventors: Matthew Parnell, London (GB); Valdemar Roxling, Malmö (SE); Peter Wilhelmsson, Lund (SE); Rory Steele, Hemel Hempstead (GB); Mattias Finné, Helsingborg (SE)

(73) Assignee: Neo4j Sweden AB, San Mateo, CA (US)

( * ) Notice: Subject to any disclaimer, the term of this patent is extended or adjusted under 35 U.S.C. 154(b) by 0 days.

(21) Appl. No.: 18/945,268

(22) Filed: Nov. 12, 2024

(65) Prior Publication Data

US 2025/0156478 A1 May 15, 2025

Related U.S. Application Data

(60) Provisional application No. 63/599,517, filed on Nov. 15, 2023.

(51) Int. Cl.
G06F 16/901 (2019.01)

(52) U.S. Cl.
CPC ................................. G06F 16/9024 (2019.01)

(58) Field of Classification Search
CPC .................................................... G06F 16/9024
See application file for complete search history.

(56) References Cited

U.S. PATENT DOCUMENTS

| | | | | |
|---|---|---|---|---|
| 7,512,612 B1 * | 3/2009 | Akella | ..................... | H04L 51/52 |
| 12,072,918 B1 * | 8/2024 | Newman | ................ | G06N 3/045 |
| 12,292,930 B1 * | 5/2025 | Miller | ................ | G06F 16/2428 |

| | | | | |
|---|---|---|---|---|
| 2013/0232174 A1 * | 9/2013 | Krajec | ................ | G06F 16/9024 |
| | | | | 707/798 |
| 2014/0019490 A1 * | 1/2014 | Roy | ........................ | G06F 16/20 |
| | | | | 707/798 |
| 2014/0280224 A1 * | 9/2014 | Feinberg | ............. | G06F 16/9024 |
| | | | | 707/748 |

(Continued)

FOREIGN PATENT DOCUMENTS

CN       115982413       4/2023

OTHER PUBLICATIONS

Feng, "Data Processing Memory and Device and Electronic Equipment" (translation), Apr. 18, 2023, pp. 1-10 (Year: 2023).*

(Continued)

*Primary Examiner* — Jorge A Casanova

(74) *Attorney, Agent, or Firm* — Van Pelt, Yi & James LLP

(57) ABSTRACT

A graph database storage engine is disclosed. In various embodiments, data associated with a node comprising a graph is received via a communication interface. The graph includes a plurality of nodes and a plurality of relationships, and wherein each node in the plurality of nodes has associated therewith a corresponding set of node data and a corresponding set of relationship data. The received data associated with the node is stored in a data storage device in a data record associated with the node, wherein the data record is stored in a static block of a fixed size stored on a single page of data on the data storage device and the data record includes at least a subset of the corresponding set of node data and the corresponding set of relationship data of the node.

20 Claims, 5 Drawing Sheets

(56) References Cited

U.S. PATENT DOCUMENTS

| | | | |
|---|---|---|---|
| 2016/0004787 A1* | 1/2016 | Shinkuma ........... | G06F 16/9024 |
| | | | 707/798 |
| 2017/0329871 A1 | 11/2017 | Subramani | |
| 2018/0121482 A1* | 5/2018 | Heen ................... | G06F 16/2358 |
| 2019/0034425 A1* | 1/2019 | Jain ................ | G06Q 10/063112 |
| 2020/0097559 A1* | 3/2020 | Wittern ............. | G06F 16/24537 |
| 2021/0319063 A1* | 10/2021 | Zimmerman ......... | G06F 16/254 |
| 2023/0137162 A1* | 5/2023 | Li ....................... | G06F 16/9024 |
| | | | 707/798 |

OTHER PUBLICATIONS

Besta et al., Demystifying graph databases: Analysis and taxonomy of data organization, system designs, and graph queries, ACM Computing Surveys 56, No. 2, arXiv:1910.09017v8, Aug. 30, 2023, pp. 1-46.

* cited by examiner

100

200

302

```
Node {
            id: long
            labels: Collection <String>
            props: Collection<Property>
            rels: Collection<Relationship>
}

Relationship { id: long
            source: Node
            target: Node
            type: String
            props: Collection<Property>
}

Property { key: String
            value: Object
}
```

400

GRAPH DATABASE STORAGE ENGINE

CROSS REFERENCE TO OTHER APPLICATIONS

This application claims priority to U.S. Provisional Patent Application No. 63/599,517 entitled GRAPH DATABASE STORAGE ENGINE filed Nov. 15, 2023 which is incorporated herein by reference for all purposes.

BACKGROUND OF THE INVENTION

A graph database may include hundreds, thousands, or many thousands of nodes, each with one or more relationships. A node may be associated with a node type or label, and each node may have one or more properties. A relationship may be directional (outgoing, incoming, or both, that later sometimes referred to as being "bidirectional" or forming a "loop") and, in some graph database systems, a relationship may have one or more properties.

In a typical graph database system, graph data may be stored as records in different files. For example, in one approach, node data may be stored in a first file, relationship data in a different file, and properties in yet another file. Pointers may be stored to associate a node stored in one with its relationships stored in one or more other files, for example, or to associate a node or relationship stored in one file with its properties stored in one or more other files. Chains (e.g., linked lists) may be built of records to handle "growing" data, e.g., as relationships are added, properties added or updated, etc.

A "page cache" abstraction may be used to access and use storage, such as a disk drive or flash drive. To read data, a "page" may be read into memory and the required data read from the page in memory. Likewise, data may be written a page at a time, and stored on disk as a page.

For a dynamic and/or large graph, storing nodes, relationships, and properties in different files typically would result in the relationship and property data for a given node may be spread across multiple pages. Further, as data is written over time, e.g., relationships added, nodes added, graph data may become further distributed (fragmented) over many (more) pages.

In one example, to access information about people with whom a person (e.g., a node type: Person) named "Bob" has a given relationship (e.g., "like" or "friend" in a social media graph), a typical graph database system and/or storage engine may have to access many disparate pages of data across which the node data may be distributed to find Bob's "person" node. The properties associated with Bob's person node may be stored in other pages. Bob's node may point to one or more relationships of the indicated type, each pointer potentially pointing to a relationship data file stored in a different page, each of which would need to be retrieved. The "person" nodes to which the relationships point then would need to be retrieved from their respective pages, and so on. Upon retrieval of a required page, other pages of data stored in memory may need to be written back to disk, to make room in memory for the required page.

The need to fetch so many pages of stored data may result in slower performance and higher consumption of computing resources.

BRIEF DESCRIPTION OF THE DRA WINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A storage engine for graph databases is disclosed. In various embodiments, a graph database system as disclosed herein includes and/or uses a storage engine that natively stores graph data in a manner that results in less fragmentation and quicker and more efficient reads than in prior systems, e.g., as described above.

Figure 1:
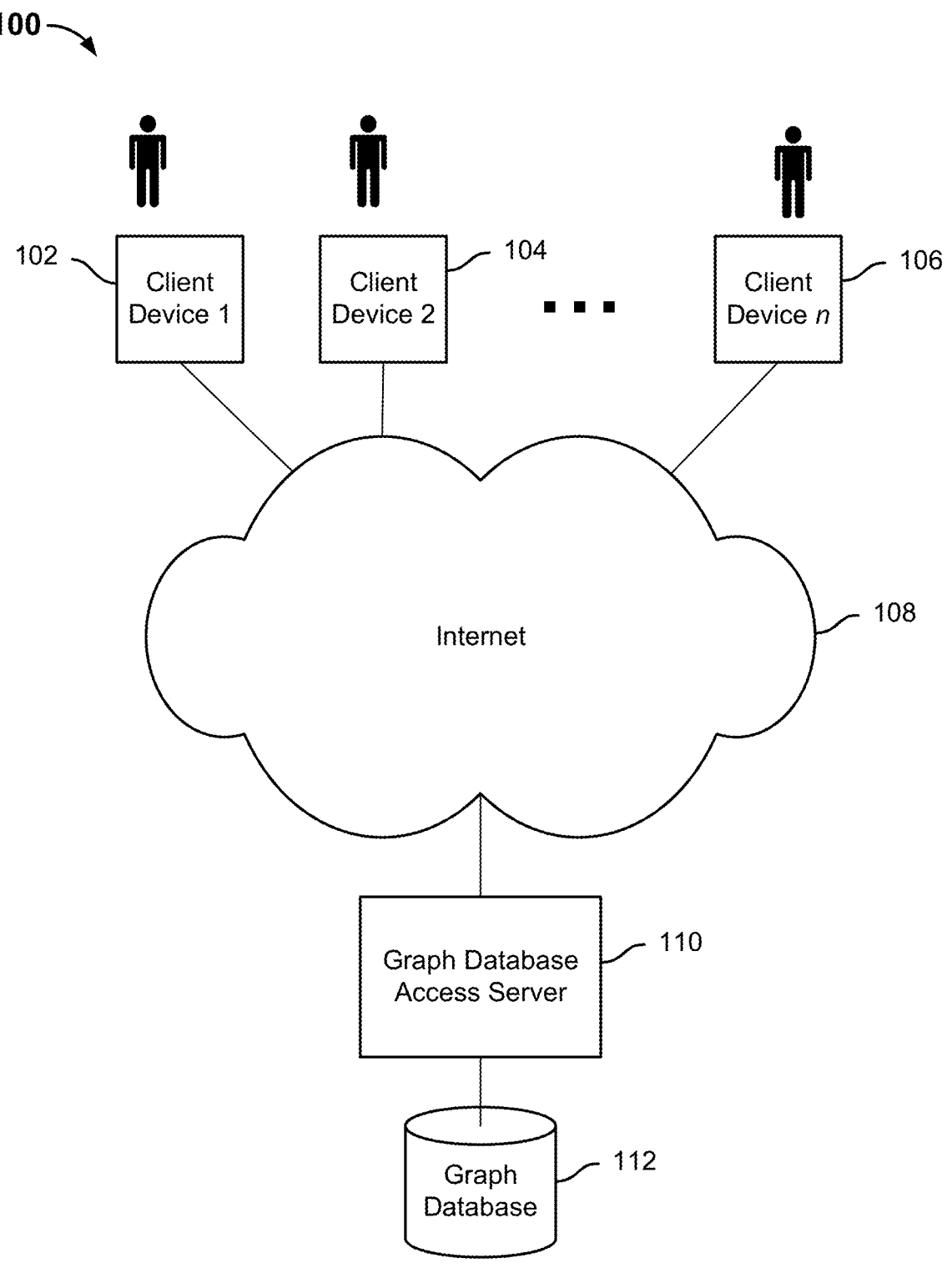
FIG. 1 is a block diagram illustrating an embodiment of a graph database system and environment.

FIG. 1 is a block diagram illustrating an embodiment of a graph database system and environment. In the example shown, graph database system and environment 100 includes a plurality of users, each associated with one or more client devices represented in FIG. 1 by client devices 102, 104, and 106. The client devices 102, 104, and 106 are connected via the Internet 108 (and/or one or more other networks) to graph database access server 110, which provides access to data stored in one or more graphs comprising graph database 112.

In various embodiments, graph database access server 110 includes a graph database storage engine as disclosed herein. The graph database storage engine stores graph data in a manner, as disclosed herein, that facilitates rapid and efficient retrieval of graph data. In various embodiments, the graph database storage engine is configured to store at least a portion of data for a given node in a same relatively small data structure stored on a single/same "page" of the underlying data storage on which the graph database 112 is stored. As a result, once the page on which the primary data record(s) associated with a node has been retrieved, at least an initial portion of the node data (e.g., node id, labels, properties) and relationship data (e.g., relationship id, type, source, target, properties, etc.) is available immediately in the page data that has already been read from a storage device and into memory.

In various embodiments, techniques disclosed herein are used to store, in read efficient ways, properties, relationships, etc. of a node that do not fit within the fixed size static storage block(s) in the small store.

Figure 2:
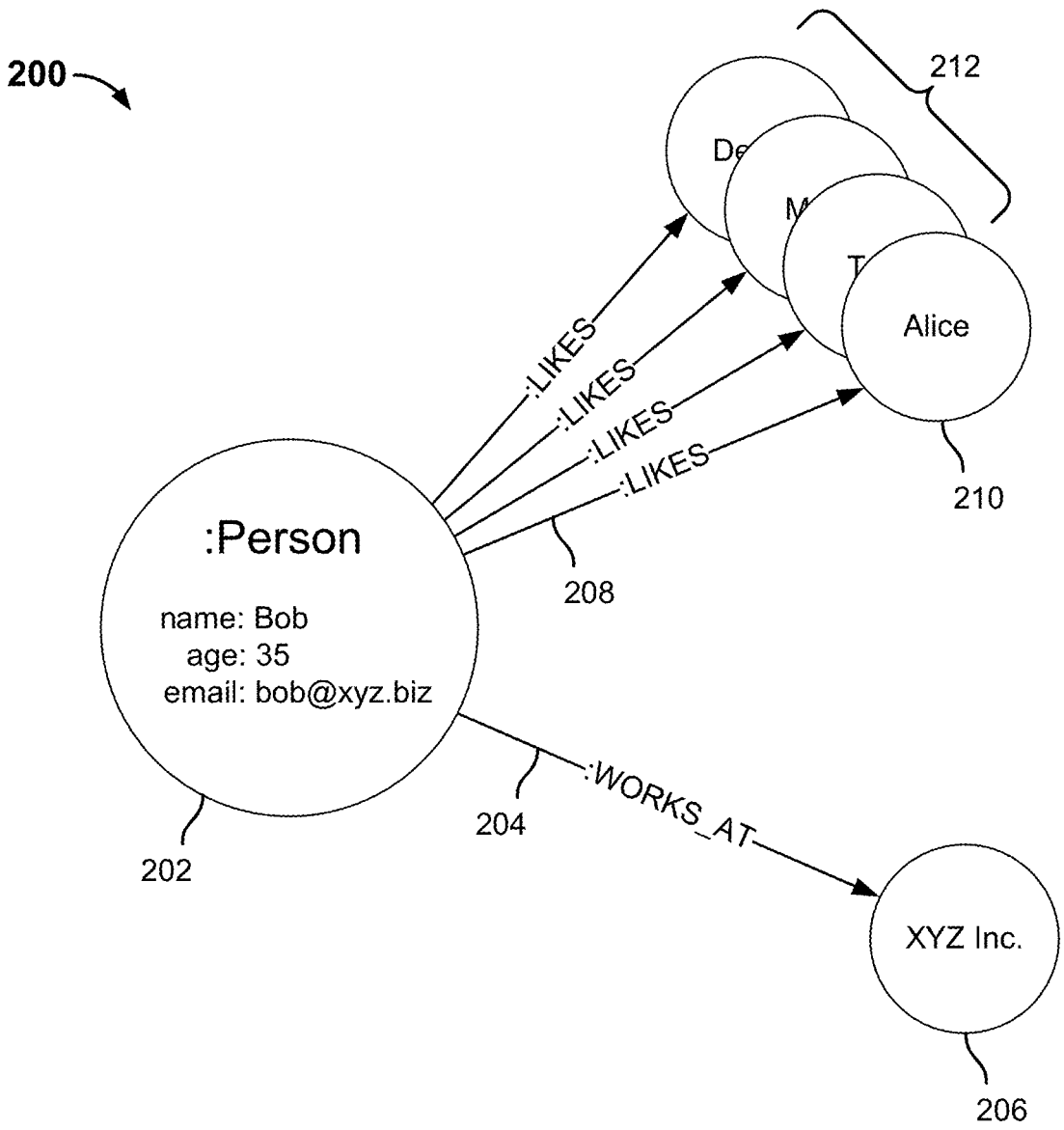
FIG. 2 is a diagram illustrating an example of a graph comprising data such as may be stored by a graph database storage engine as disclosed herein.

FIG. 2 is a diagram illustrating an example of a graph comprising data such as may be stored by a graph database storage engine as disclosed herein. In the example shown, graph 200 includes a node 202 labeled "Person" having "name", "age", and "email" properties as shown. The Person represented by node 202 (i.e., "Bob") has a relationship 204 of a type "Works At" with a company "XYZ, Inc." represented by node 206. In addition, "Bob" (represented by node 202) has a "Likes" relationship 208 to "Alice", represented by Person node 210, and an additional "Likes" relationship with each of the individuals represented by Person nodes 212.

Figures 3, 4:
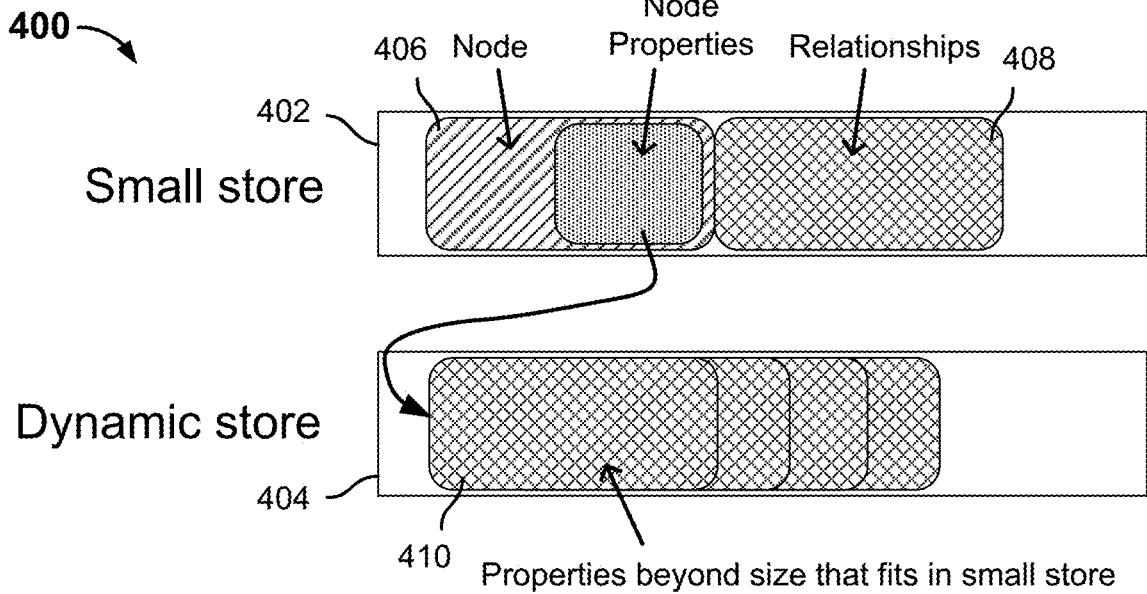
FIG. 3 is a diagram illustrating an example class definitions used to store graph data in an embodiment of a graph database storage engine.
FIG. 4 is a block diagram illustrating a layout and scheme to store graph data in an embodiment of a graph database system.

FIG. 3 is a diagram illustrating an example class definitions used to store graph data in an embodiment of a graph database storage engine. For example, the definitions 302 may be used to instantiate objects to represent and store the data associated with the nodes (202, 206, 210, and 212) and relationships (204, 208) comprising graph 200 of FIG. 2. In the example shown, definitions 302 include definitions of objects to represent and store data for graph Nodes, Relationships, and Properties.

In various embodiments, a bounded amount of node, relationship, and property data is stored contiguously in one or more records collocated on a single storage "page". In some embodiments, dynamic records and tree structures are used to handle "growing" data, e.g., a number and/or size of relationships, properties, etc. that exceeds the bounds defined for the primary store, sometimes referred to herein as a "small store".

FIG. 4 is a block diagram illustrating a layout and scheme to store graph data in an embodiment of a graph database system. In the example shown, data storage scheme 400 includes one or more small data stores 402 and one or more dynamic data stores 404. Each small store 402 includes one or more static data blocks of a same, fixed size, each configured to store one or more records comprising data associated with a corresponding node. In the example shown, a static block of data associated with a given node includes two records, node record 406 comprising node data and node properties and relationship record 408 comprising relationship data and properties. For example, a static block associated with a node may include a first record comprising node data (node id, node label(s), node properties) and a second record comprising node relationship data (relationship id, type, source, target, relationship properties, etc.). In various embodiments, at least a substantial portion of node and relationship data for any give node is stored in a static, same-size block on the same logical page of data.

In some embodiments, a "small store" comprises a set of static data blocks, each of a bounded, predefined size, e.g., 128 B. Each block contains two records, e.g., 64 B each. For example, a 128 B static block comprising a small store may be identified by a node identifier and may include a 64 B node data record and a 64B relationships data record. In various embodiments, static blocks of the same predefined size are used, even for an empty node. In many graph data sets, most or all nodes would fit in a single 128 B block. For each node, in some embodiments, up to 10 node labels and/or properties and 5 relationships could be stored in a 128 B static block.

The overall size of the "small store", in various embodiments, may depend at least in part on the number of nodes. For example, in an embodiment as described in the paragraph immediately above, the small store may be large enough to include two 64 B records for each node in the graph.

In various embodiments, properties are stored as key-value pairs. In some embodiments, keys $[k_1, k_2, k_3, \ldots]$ and data representing the size $[s_1, s_2, s_3, \ldots]$ of respective corresponding values $[v_1, v_2, v_3, \ldots]$ are stored separately from the values themselves. For example, the key-size pairs may be stored separately from the values, e.g., $[k_1 \ s_1, k_2, s_2, k_3, s_3, \ldots] [v_1, v_2, v_3, \ldots]$, with the key-size pairs being stored inline in a first region of the node record followed by the values stored in a second region. In some embodiments, keys are sorted with value size to allow skipping for fast traversal. For example, if a property identified by key $k_3$ were to be read, once the key $k_3$ was found the corresponding value $v_3$ could be skipped to in the value portion of the record based on the sizes $s_1$ and $s_2$.

In some embodiments, relationships are stored by type for fast filtering, e.g., $[t_1 \ s_1] [r_{11}, r_{12}, r_{13}, \ldots] [t_2 \ s_2] [r_{21}, r_{22}, \ldots] \ldots$.

In some embodiments, within each relationship type relationships are stored in the order {OUTGOING, LOOP, INCOMING} for fast filtering. For example, to read outgoing relationships of a given type reads start with the OUTGOING and continue with LOOP relationships (since the latter include an OUTGOING direction) and to read incoming relationships of a given type reads start with the LOOP relationships of that type (since each LOOP includes an INCOMING direction) and continue with INCOMING relationships, skipping over the OUTGOING relationships.

In various embodiments, a block in the small store may include one or more pointers to a "dynamic store" associated with the node with which the small store block is associated, such as dynamic store 404 of FIG. 4. For example, a node with more than 5 relationships may include a pointer to a dynamic store that includes relationship data that did not fit in the relationship record portion of the node's data in the small store. In various embodiments, the dynamic store for a node grows and shrinks in units of a size that is the same as (or otherwise related to) the size of the small store block, e.g., units of 128 B blocks, such as dynamic store blocks 410 of FIG. 4. Dynamic store blocks for a given node may be stored contiguously, e.g., on the same page, to facilitate access with minimal page reads/faults.

In some embodiments, a dynamic node store used to store node labels and/or properties may include $n \in \{1, 2, 3, 4, 6, 8, 12, 16, 24, 32, 40, 48, 56, 64\}$ static blocks, each of the same size, e.g., 128 B, i.e., up to $n=64 \times 128 \ B=8,192 \ B$ of node records. A dynamic relationship store may include n E {1, 2, 3, 4, 6, 8, 12, 16} static blocks, each of the same size, e.g., 128 B, i.e., up to n=16×128 B=2,048 B of node records.

FIGS. 5A through 5D illustrate an example of data retrieval in an embodiment of a graph database system. For example, data retrieval as illustrated in FIGS. 5A through 5D may be performed, in various embodiments, with respect to a graph data comprising a graph such as graph 200 of FIG. 200.

Figures 5A, 5B:
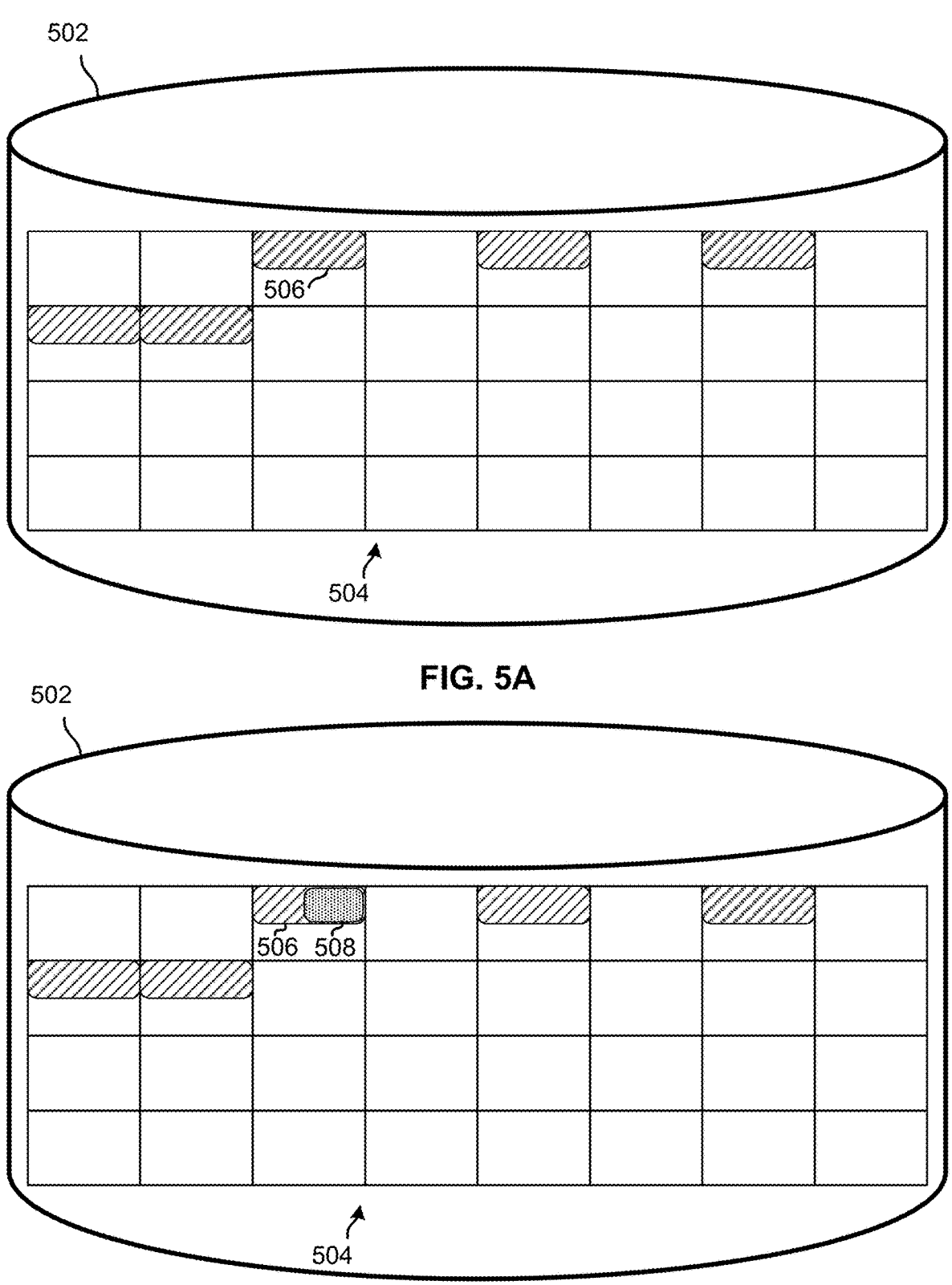
FIGS. 5A through 5D illustrate an example of data retrieval in an embodiment of a graph database system.

Referring first to FIG. 5A, graph data storage device 502 (e.g., one or more disk drives) is shown to include paginated data storage 504 comprising, in the example shown, 32 pages of data (represented by the 4 row×8 column grid). Each of a plurality of "Person" nodes (e.g., node 202, node 210, and three nodes 212) may be represented by a corresponding set of records in a static block, e.g., a node record and a relationship record, as described above. For example, static block 506 may represent and store data associated with node 202 of FIG. 2, i.e., the "Person" node of the person named "Bob".

A graph database query (e.g., the Cypher™ query MATCH (:Person)) may seek first to "match" (i.e., find) nodes having the label "Person", such as Person nodes 202, 210, and 212 of FIG. 2. In the example shown in FIG. 5A, each of the five "Person" nodes of graph 200 of FIG. 2 is represented by a corresponding node record, such as node record 506, each in this example in a "small store" stored in a different page comprising the paginated data storage 504.

Referring to FIG. 5B, the query may further specify that the Person node having the value "Bob" for the "name" property is sought (e.g., MATCH (:Person {name: 'Bob'})). As shown in FIG. 5B, in response Bob's "Person" node 506, which includes and/or is stored adjacent to Bob's relationship data 508, is found.

Figure 5C:
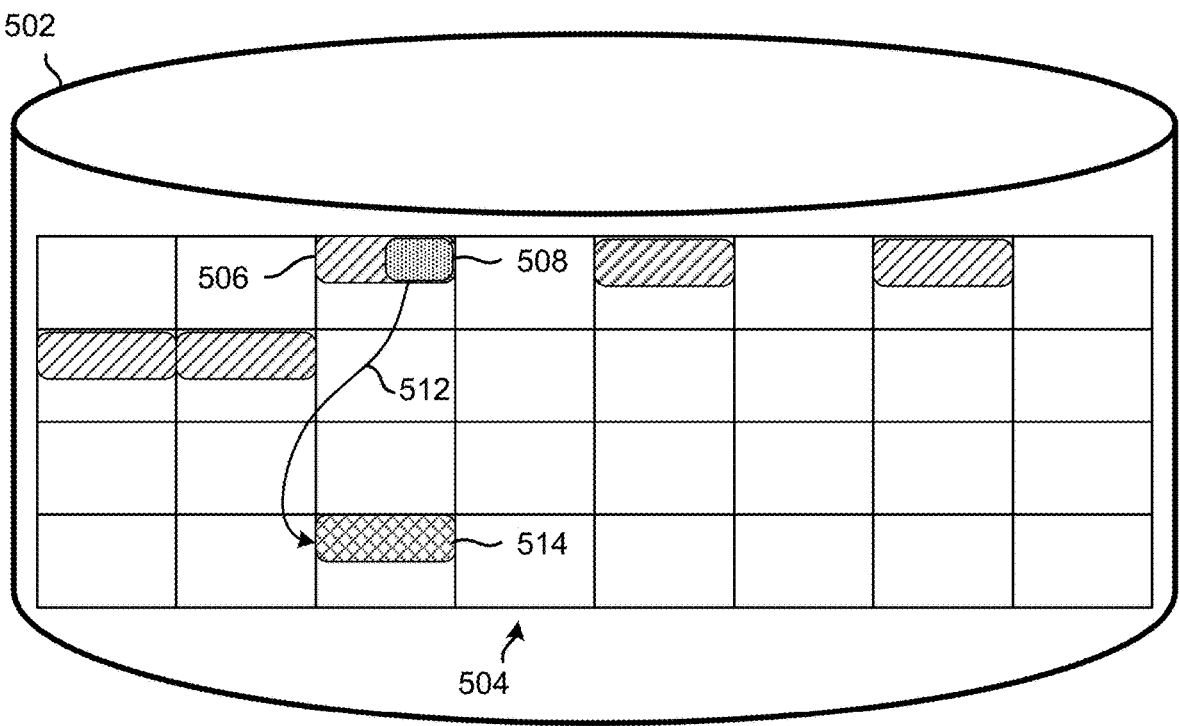

As shown in FIG. 5C, the query may further specify that a node to which Bob has a "Likes" relationship is sought, e.g., MATCH ( : Person {name : 'Bob' ] ) – [r : LIKES] –> ().

In the example shown in FIG. 5C, Bob's relationship record 508 includes a pointer 512 that points to a dynamic property store 514 in which Bob's relationships of the type "Likes" are stored, e.g., as result of Bob's "Likes" relationship data not fitting in the bounded sized static records (506, 508) for Bob's node in the "small store". For example, Bob may have a lot of friends.

Figure 5D:
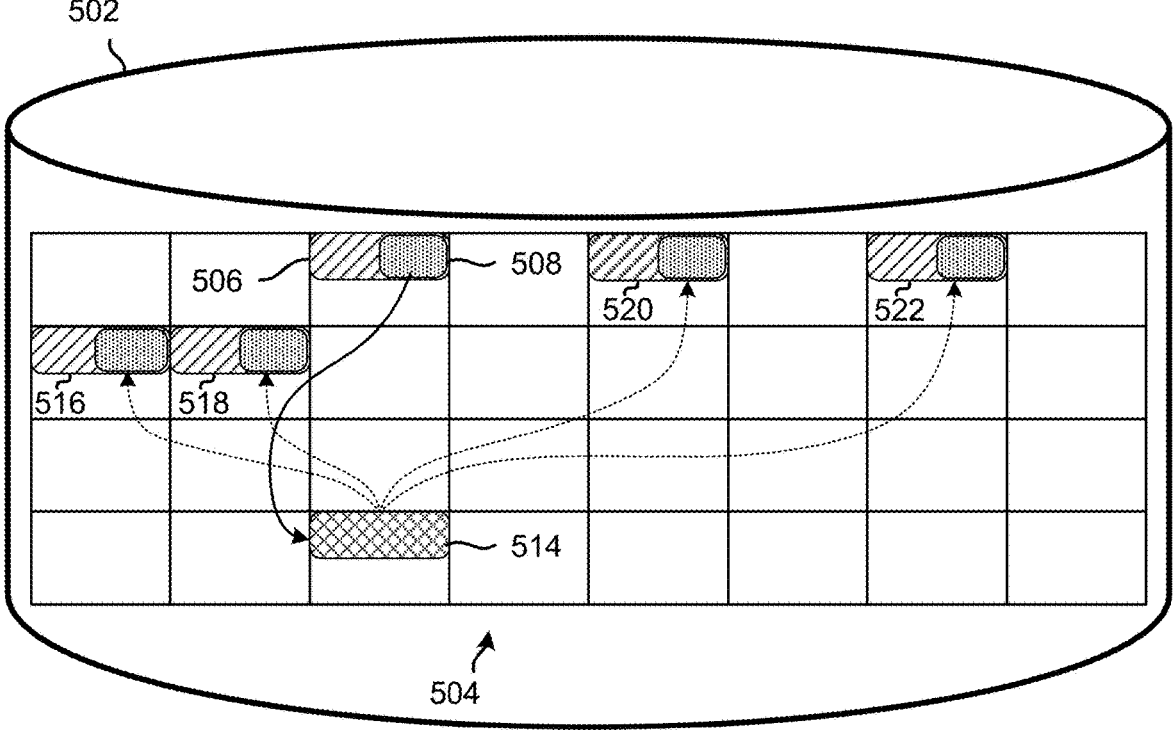

As shown in FIG. 5D, Bob's relationship data includes pointers, represented in FIG. 5D by dashed arrows, to the target nodes to which Bob has a "Likes" relationship, i.e., the Person nodes 516, 518, 520, and 522, in this example. If, for example, the query were further refined to specify a target Person node having the value "Alice" for the "name" property, e.g., MATCH (:Person {name: 'Bob'})–[r: LIKES]→(:Person {name: 'Alice'}), then a system as disclosed herein would search for a "Person" named "Alice" with whom Bob has a "Likes" relationship by following pointers, i.e., the dashed arrow pointers as represented in FIG. 5D, but the properties of each such node would be collocated with the destination Person node, on the same page that had already been read into memory to fine the node, so the Person with name "Alice" found more quickly, with fewer page reads than in a typical prior art system.

In some embodiments, a "big property value" store comprises a specialized dynamic store, which grows/shrinks in units of 64 B and which is used when properties cannot be inlined (i.e., included in the small store record). Examples of a big property value include, without limitations, a large file, such as a video file.

In some embodiments, a "dense" store layout is defined to store relationship data that exceeds the bounds of the small store and/or dynamic store. In some embodiments, the dense store is used when relationships of a type exceed the dynamic store capacity. The dense store may be implemented as a multi-root "forest" of trees (e.g., B-trees) of "tree of trees", having a separate root/tree for each node. The dense store may comprise a separate root for each node. In some embodiments, the dense node effectively comprises a map of {this node, type, direction, other node}→properties. The dense store may use and/or be used in connection with a bloom filter in the corresponding small store record.

In various embodiments, techniques disclosed herein may be used to provide a graph database storage engine that increase efficiency and speed of a graph database system, e.g., by enabling a node and associated data to be retrieved by reading data from fewer pages.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A graph database system, comprising:
   a communication interface; and
   a processor coupled to the communication interface and configured to:
      receive, via the communication interface, data associated with a node comprising a graph, wherein the graph includes a plurality of nodes and a plurality of relationships, and wherein each node in the plurality of nodes has associated therewith a corresponding set of node data and a corresponding set of relationship data; and
      store the received data associated with the node in a data storage device in a data record associated with the node, wherein the data record is stored in a static block of a fixed size stored on a single page of data on the data storage device and the data record includes at least a subset of the corresponding set of node data and the corresponding set of relationship data of the node;
      wherein the single page of data on the data storage device comprises a plurality of static blocks of the fixed size each of which is associated with a corresponding one of the plurality of nodes, a first subset of the static blocks comprising a pair of fixed sized records including a node record comprising node data of the node and a relationship record comprising relationship data of the node and a second subset of the static blocks comprising additional node data of associated with a node with which a corresponding static block in the first subset is associated and to which the corresponding static block in the first subset includes a pointer.

2. The system of claim 1, wherein the corresponding set of node data of a node includes a node label.

3. The system of claim 1, wherein the corresponding set of node data of a node includes one or more properties of the node.

4. The system of claim 1, wherein the processor is configured to store in the data storage device, for each node included in the graph, one or more data records associated uniquely with that node, the data records being stored in a corresponding static block of the fixed size stored on a corresponding single page of data on the data storage device, each such data record including at least a subset of a set of node data and a set of relationship data of corresponding to that node.

5. The system of claim 1, wherein the data record comprises a first data record and the processor is configured to store in the same static block as the first data record a second data record.

6. The system of claim 5, wherein the first data record and the second data record are of the same size.

7. The system of claim 5, wherein the first data record stores node data, including one or more of a node label and a node property.

8. The system of claim 7, wherein the second data record stores node relationship data.

9. The system of claim 1, wherein the corresponding set of node data includes data that exceeds the size of the data record and the data record includes a pointer to a dynamic data store configured to store at least a portion of the corresponding set of node data that is not stored in the data record.

10. The system of claim 9, wherein the dynamic data store is stored in the data storage device on a different page than the page on which the data record is stored.

11. The system of claim 9, wherein the dynamic data store includes a set of one or more dynamic data records of a same fixed size.

12. The system of claim 11, wherein the processor is configured to grow or shrink the dynamic data store in units of the same fixed size as needed to store node data that does not fit in the data record.

13. The system of claim 1, wherein one or both of the corresponding set of node data and the corresponding set of relationship data of the node comprises property data and the processor is configured to store the property data as a set of key value pairs.

14. The system of claim 13, wherein the keys and corresponding value sizes are stored separately from the values.

15. The system of claim 13, wherein the keys and values are sorted by value size to facilitate fast traversal.

16. The system of claim 1, wherein the relationship data is stored by type for fast filtering.

17. The system of claim 16, wherein within each type the relationship data is stored with outgoing only relationships first, then bidirectional or loop relationships second, then incoming relationships third to facilitate fast filtering.

18. The system of claim 1, further comprising a memory and wherein the processor is further configured to retrieve from the data storage and store in the memory said single page of data that includes the data record associated with the node.

19. A method of storing graph data, comprising:
   receiving, via a communication interface, data associated with a node comprising a graph, wherein the graph includes a plurality of nodes and a plurality of relationships, and wherein each node in the plurality of nodes has associated therewith a corresponding set of node data and a corresponding set of relationship data; and
   storing the received data associated with the node in a data storage device in a data record associated with the node, wherein the data record is stored in a static block of a fixed size stored on a single page of data on the data storage device and the data record includes at least a subset of the corresponding set of node data and the corresponding set of relationship data of the node;
wherein the single page of data on the data storage device comprises a plurality of static blocks of the fixed size each of which is associated with a corresponding one of the plurality of nodes, a first subset of the static blocks comprising a pair of fixed sized records including a node record comprising node data of the node and a relationship record comprising relationship data of the node and a second subset of the static blocks comprising additional node data of associated with a node with which a corresponding static block in the first subset is associated and to which the corresponding static block in the first subset includes a pointer.

20. A computer program product embodied in a non-transitory computer readable medium and comprising computer instructions for:
   receiving, via a communication interface, data associated with a node comprising a graph, wherein the graph includes a plurality of nodes and a plurality of relationships, and wherein each node in the plurality of nodes has associated therewith a corresponding set of node data and a corresponding set of relationship data; and
   storing the received data associated with the node in a data storage device in a data record associated with the node, wherein the data record is stored in a static block of a fixed size stored on a single page of data on the data storage device and the data record includes at least a subset of the corresponding set of node data and the corresponding set of relationship data of the node;
wherein the single page of data on the data storage device comprises a plurality of static blocks of the fixed size each of which is associated with a corresponding one of the plurality of nodes, a first subset of the static blocks comprising a pair of fixed sized records including a node record comprising node data of the node and a relationship record comprising relationship data of the node and a second subset of the static blocks comprising additional node data of associated with a node with which a corresponding static block in the first subset is associated and to which the corresponding static block in the first subset includes a pointer.

* * * * *